Nov. 28, 1967     D. W. BERREMAN     3,355,235
GASEOUS LENS EMPLOYING REFRIGERANT EFFECT
Filed Oct. 7, 1964
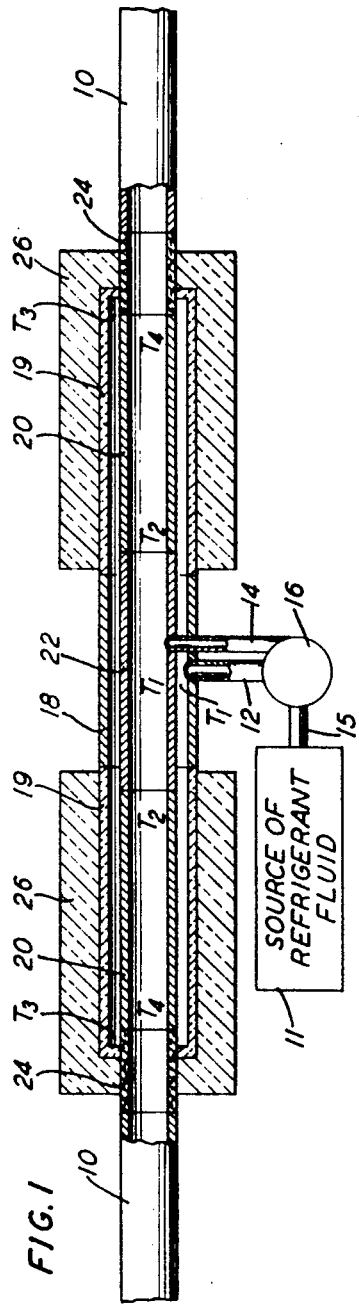
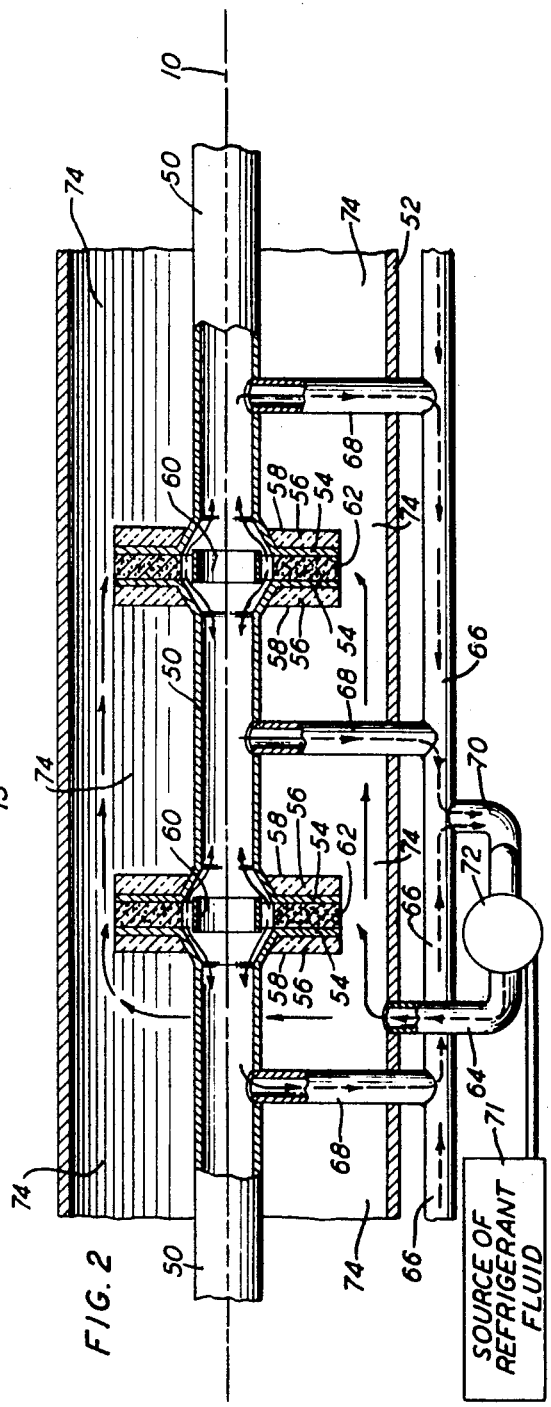
INVENTOR
*D.W. BERREMAN*
BY *H. O. Wright*
ATTORNEY

United States Patent Office 3,355,235
Patented Nov. 28, 1967

3,355,235
GASEOUS LENS EMPLOYING REFRIGERANT EFFECT
Dwight W. Berreman, Westfield, N.J., assignor to Bell Telephone Laboratories, Incorporated, New York, N.Y., a corporation of New York
Filed Oct. 7, 1964, Ser. No. 402,170
3 Claims. (Cl. 350—180)

This invention relates to the long distance transmission of a beam of ultrahigh frequency electromagnetic wave energy. More particularly, it relates to means for focusing such beams at intervals along a conduit enclosing a long distance transmission path for such beams.

Devices of the invention are related to numerous other devices directed toward the same or similar general objectives such as those disclosed and claimed in the following copending applications, all of which have been assigned to applicant's assignee: Applicant's sole applications Ser. No. 347,166, filed Feb. 25, 1964; Ser. No. 353,689, filed Mar. 23, 1964; Ser. No. 372,992, filed June 5, 1964, and Ser. No. 385,739, filed July 28, 1964; applicant's joint application with S. E. Miller, Ser. No. 379,175, filed June 30, 1964; Ser. No. 357,424, filed Apr. 6, 1964 by K. B. McAfee, Jr.; Ser. No. 379,112, filed June 30, 1964 by A. C. Beck, G. E. Conklin and A. R. Hutson; Ser. No. 382,873, filed July 15, 1964, by E. A. J. Marcatili; and Ser. No. 384,510, filed July 22, 1964, by J. H. Whinnery.

In applicant's above-mentioned copending joint application with S. E. Miller, it is taught that a "gaseous lens" or focusing region can be established in a conduit by causing a laminar flow of cool gas to pass through a heated tube. In such an arrangement, along a section of the conduit, the outer laminas of the flow of gas become heated while the more centrally located laminas remain as substantially the initial temperature of the flow, thus establishing, over a short distance, a radially varying temperature gradient varying from a relatively low temperature along the axis to a maximum at the inner periphery of the tube. Since the refractive index of a gas is, in general, inversely proportional to its temperature, the above described arrangement establishes a radially varying gradient of the refractive index which varies from a maximum at the axis to a minimum at the inner periphery of the tube. This obviously produces a converging focusing effect upon a beam of ultrahigh frequency wave energy such as a laser beam or the like when the beam is transmitted along a path substantially concentric with the axis of the tube.

In accordance with the present invention, advantage is taken of the well known Joule-Thompson or refrigerant effect to supply cool gas and to introduce it into prescribed portions of the conduit. In accordance with the Joule-Thompson effect, when a compressed fluid, that is, either a liquid or a gas, is permitted to expand (by passing to a region of lower pressure) its temperature is also lowered in proportion to the change in pressure. The effect is appreciably augmented if initially the compressed substance is a liquid and in the process of expanding becomes (that is, "evaporates" to) a gas. This is, of course, essentially the phenomenon employed in a multiplicity of cooling and refrigerating machines now universally in use.

By further arranging to have an adjacent portion of the conduit maintained at a higher temperature, and causing the cool gas to flow through the last mentioned portion, the outer laminas of the flow of cool gas resulting from the expansion and/or evaporation process are warmed and, as in the arrangement of my above-mentioned copending joint application, a radially varying gradient of the refractive index is established across a section of the conduit which in turn produces a convergent focusing effect on a beam transmitted along a path substantially concentric with the longitudinal axis of the conduit.

Since the temperature of portions of the conduit adjacent those into which the cool gas is introduced can be maintained at a higher temperature by merely making the walls of such adjacent portions of a material, such as copper, which freely transmits heat, and subjecting the outer periphery of such adjacent portions to the compressed gas or liquid, arrangements of the present invention do not require separate heating means to provide the "hot tube" adjacent portions of the conduit.

Accordingly, a principal object of the invention is to simplify arrangements for establishing a gaseous type lens in a conduit for the transmission of ultrahigh frequency electromagnetic wave beams.

Other and further objects, features and advantages of the invention will become apparent from a perusal of the following specification, and the appended claims, taken in conjunction with the accompanying drawing, in which:

FIG. 1 diagrammatically exemplifies a first illustrative embodiment of the principles of the invention; and FIG. 2 diagrammatically exemplifies a second illustrative embodiment of the principles of the invention.

In more detail in FIG. 1, a symmetrical arrangement is diagrammatically illustrated which comprises a conduit including a central portion 22 which is of a material highly conductive to heat such, for example, as copper. At each end of portion 22 a portion of conduit 20, which is permeable to gas or liquid under appreciable pressure, is positioned as shown. These portions, it should be particularly noted, are of a material permeable to gas or liquid only under appreciable pressure since an appreciable drop in pressure is required if an appreciable cooling or Joule-Thompson effect is to be realized. They may, for example, be of firmly compacted furnace clay or the like. At the outer end of each portion 20 a short portion 24 is preferably added to reduce the possible transfer of heat to the outer ends of portions 20 from other portions of the conduit to be connected thereto. Portions 24 are of a material substantially nonconductive to heat such as, for example, asbestos fiber or the like. The outer ends of portions 24 may then connect to portions 10 of a conduit of any appropriate material, metallic, or ceramic, or the like, deemed suitable for a conduit to enclose, for example, a path substantially concentric with the longitudinal axis of the conduit for the transmission of a beam of ultrahigh frequency electromagnetic wave energy.

A second tubular member 18 which can, for example, be of copper or other material highly conductive to heat, together with right and left end portions 19 which are preferably of heat insulating material, enclose an elongated annular space surrounding the above described portions 20 and 22, the extreme right and left ends of portions 19 being turned inwardly to snugly fit the right and left above described members 24, respectively, as shown. Additional heat insulating members 26 surround the right and left end portions 19, as shown, to effectively inhibit the transfer of heat from the surrounding environment to portions 19.

A compressor 16 and source 11 of, for example, liquid deca perfluoro butane ($C_4F_{10}$) supplies this liquid to fill the above described elongated annular space through pipe 15 and output pipe 12 under, for example, a pressure of substantially thirty pounds per square inch (that is, substantially fifteen pounds per square inch above atmospheric pressure) and at a temperature $T_1$ of substantially eighteen and three-tenths degrees centigrade. In diffusing through permeable members 20, the liquid can be caused to drop in pressure to substantially atmospheric pressure (that is, substantially fifteen pounds per square inch) and become a gas at a temperature $T_4$ in the order of two and one-half degrees centigrade below zero at the extreme right end of right member 20 and the extreme left end of left member 20.

The above described central portion 22 of conduit will then have a temperature of $T_1$ which may be, for example, substantially eighteen degrees centigrade at its center but a somewhat lower temperature $T_2$ at its right and left ends as indicated in FIG. 1. Similarly, the temperature $T_3$ at the right end of the right member 19 and the left end of the left member 19 will be somewhat lower than $T_2$, and the temperature $T_4$ at the right end and inside of right member 20 and at the left end and inside of left member 20 will be in the order of two and one-half degrees centigrade below zero, which will be appreciably lower than temperature $T_3$ and very appreciably lower than temperature $T_2$ as described above.

Compressor 16 exhausts the gas from the interior of members 22 and 20 through pipe 14 and compresses it back to a liquid at substantially thirty pounds per square inch simultaneously raising its temperature to a temperature of substantially eighteen and three-tenths degrees centigrade, for example, when it can be reintroduced to the system through pipe 12 to repeat the cycle described in detail above. Source 11 can, of course, be arranged to supply any additional liquid as may be required to compensate for leakage losses or the like.

The cool gas in the interior of members 20 as it is drawn toward member 22 has its outer laminas raised in temperature from temperature $T_4$ to $T_2$ and then to $T_1$. Member 22, and to a lesser extent the more centrally located portions of members 20, act as the "heated tubes" of hot tube gaseous lens of the general type described in my above-mentioned copending application with S. E. Miller to create a radially varying gradient of the refractive index of the gas, thus subjecting a laser beam or the like transmitted along a path substantially concentric with the longitudinal axis of the composite central conduit of FIG. 1 to a convergent focusing effect.

The arrangement of FIG. 1 has been described above as employing a fluid which is initially a liquid as the "refrigerant." For this particular embodiment, such a refrigerant is preferable to a gas since, in general, appreciably smaller pressure changes are required and are more readily effected in such a structure. Furthermore, much larger temperature changes are obtained.

The structure could, however, be operated with a refrigerant which is a gas at all points throughout the system. For example, if carbon dioxide gas were to be employed, it should be introduced into the enclosure formed by members 18 and 19 at a pressure in the order of one hundred pounds per square inch. In passing through permeable tubes 20, a pressure reduction to substantially atmospheric pressure should preferably be effected. This would normally require the use of much thicker permeable members 20 of more highly compacted material. If the initial temperature of the compressed gas were, for example, twenty degrees centigrade, substantially as for the liquid refrigerant described above, the temperature $T_4$ within the members 20 at their respective outer ends would be in the order of fourteen degrees centigrade. Obviously, less effective temperature gradients are likely to result when using a gas as compared with those which can be readily obtained with an initially liquid refrigerant as described in detail above.

If, however, it is deemed expedient to employ a "refrigerant" which is at all points in the system a gas, the structure of FIG. 2 may be employed in preference to that of FIG. 1 principally because the form of permeable members 62, described below, is better adapted to use in systems requiring relatively large pressure changes in the gas than are readily obtained using tubular members such as members 20 of FIG. 1.

In FIG. 2 another arrangement based upon the same generic concept as for that of FIG. 1 is diagrammatically exemplified. In FIG. 2 both the inner conduit 50 and the outer conduit 52 are impervious to gas. At intervals at which it is found appropriate to form gaseous convergent lenses within the inner conduit 50, an annular washer 62 of a compacted but permeable material such, for example, as diatomaceous earth, is held by a pair of rigid annular members 54, preferably of heat insulating material, attached to conduit 50. On the outer sides of members 54 heat insulating members 58 of a heat insulating material 56 such as "rock wool," spun glass, or the like are attached to members 54 to prevent heat from the compressed gas in the space 74 between conduits 50 and 52 from reducing the temperature drop of gas passing through member 62. A pressure of substantially one hundred pounds per square inch of carbon dioxide is maintained in space 74, for example, by a pump 72 supplying compressed gas such, for example, as carbon dioxide, from source 71, through tube 64. The pressure in space 74 should be in the order of one hundred pounds per square inch. Pump 72 draws gas from the interior of conduit 50 through tubes 66, 68, and 70. The pressure in conduit 50 may, for example, be substantially that of the surrounding atmosphere.

In operation, gas passing from space 74 through members 62 is reduced in pressure and temperature and directed by baffle ring members 60 to the right and left along the interior of conduit 50. The walls of conduit 50 should be of heat conducting material such, for example, as copper so that the temperature of the inner surface of the portions of conduit 50 will be substantially that of the compressed gas within space 74.

Accordingly, the cool gas flowing to the right and left from the inner side of each porous member 62 has its outer laminas heated by the adjacent walls of conduit 50 and, as explained in detail above, a "gaseous lens" producing a convergent focusing effect on a laser beam or the like transmitted along a path substantially concentric with axis 10 is thus established. Source 71 may supply additional gas as may be required to compensate for leakage losses or the like.

Numerous and varied modifications and rearrangements of the illustrative embodiments desribed in detail above can readily be devised by those skilled in the art without departing from the spirit and scope of the principles of the present invention. Accordingly, the invention is clearly not limited but only illustrated by the specific embodiments described.

What is claimed is:

1. A structure for establishing a gaseous lens for focusing a beam of ultrahigh frequency electromagnetic wave energy comprising a section of conduit having a path substantially concentric with its longitudinal axis for the transmission of said beam, means impervious to fluid enclosing an annular space surrounding said section of conduit, an input port connected to said annular space for injecting a fluid under appreciable pressure to fill said space, said section of conduit including a portion permeable to said fluid under appreciable pressure and an adjacent portion of a material highly conductive to heat and impervious to fluid, both said portions being interposed between said enclosed annular space and the interior of said section of conduit, and an exhaust port connected to said section of conduit for removing gas from the interior of said section of conduit through the said adjacent impervious portion of said section.

2. The structure of claim 1 in which the said portion permeable to fluid under pressure is an elongated tube.

3. The structure of claim 1 in which the said portion permeable to fluid is a toroid having an inner diameter moderately larger than the internal diameter of said section of conduit and an outer diameter several times greater than the diameter of said section of conduit, said toroid being supported on each side by means impervious to fluid and nonconductive to heat.

No references cited.

JEWELL H. PEDERSEN, *Primary Examiner.*

R. J. STERN, *Assistant Examiner.*